United States Patent [19]

Schlosser

[11] Patent Number: 4,627,408

[45] Date of Patent: Dec. 9, 1986

[54] VAPORIZING ELEMENT FOR PORTABLE GRILL

[75] Inventor: Erich J. Schlosser, Lindenhurst, Ill.

[73] Assignee: Weber-Stephen Products Co., Palatine, Ill.

[21] Appl. No.: 758,244

[22] Filed: Jul. 24, 1985

[51] Int. Cl.[4] .............................................. F24C 3/04
[52] U.S. Cl. ................................... 126/41 R; 126/332
[58] Field of Search ............. 126/41 R, 337 A, 337 R, 126/332; 99/446

[56] References Cited

U.S. PATENT DOCUMENTS

| | | | |
|---|---|---|---|
| 2,722,883 | 11/1955 | Rignell | 99/446 |
| 2,903,549 | 9/1959 | Joseph | 219/35 |
| 2,905,077 | 9/1959 | Del Francia | 99/446 |
| 3,348,472 | 10/1967 | Anetsberger et al. | 99/447 |
| 3,396,716 | 8/1968 | Weyland et al. | 126/41 R |
| 3,593,647 | 7/1971 | Copeland | 126/41 R |
| 3,771,510 | 11/1973 | Short | 126/41 R |
| 4,321,857 | 3/1982 | Best | 99/340 |

FOREIGN PATENT DOCUMENTS 602071 7/1978 Switzerland .................. 126/337 R

Primary Examiner—Carroll B. Dority, Jr.
Attorney, Agent, or Firm—Robert E. Wagner; Ralph R. Rath

[57] ABSTRACT

A flavorizing element for evaporating greases in an outdoor gas grill consists of an inverted V-shaped member having a pair of flat inclined walls defining an included angle of more than 90° so that grease will evaporate while flowing across the heated inclined walls. The walls have vent openings formed by deforming tabs in the walls.

2 Claims, 4 Drawing Figures

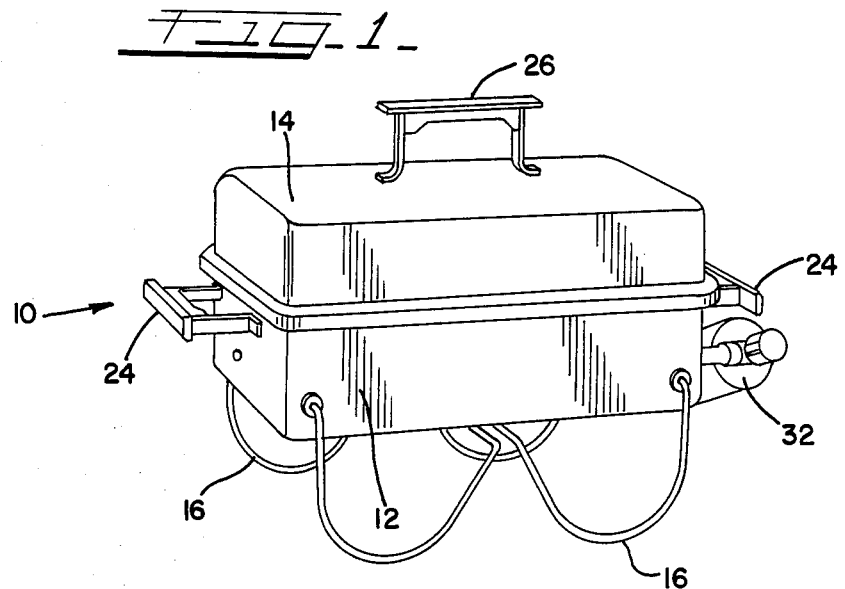
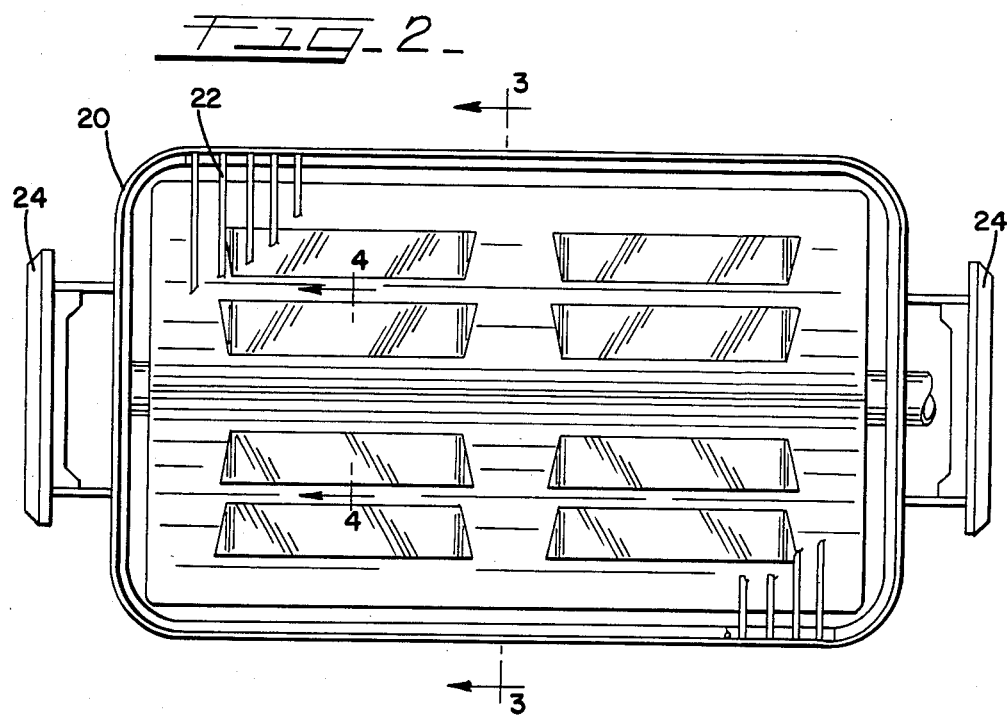

VAPORIZING ELEMENT FOR PORTABLE GRILL

DESCRIPTION

1. Technical Field

The present invention relates generally to portable cooking grills and, more particularly, to gas grills.

2. Background Prior Art

Portable gas grills have become very popular as outdoor cooking devices, and usually consist of a cart that is supported on wheels and has a cooking vessel supported thereon. The cooking vessel usually has gas burners in the lower portion of the vessel with a grid structure above the gas burners that supports a heat-absorbing material, such as lava rock. A cooking grid is positioned above and spaced from the lava rock. The lava rock is a porous heat-absorbing material which absorbs the heat from the gas burner and thereafter provides the heat for cooking the food.

More recently, the Assignee of the present invention has been marketing a more portable unit which can easily be carried to a camp site and has found a remarkable degree of commercial success.

One of the problems with the lava rock is the fact that any greases dripping from the foods being cooked impinge on the lava rock and have a tendency to ignite, producing uncontrolled flare-ups which can ruin the food being cooked. Another problem is the fact that the lava rock absorbs the grease and, thus, becomes rather unsightly.

A further objection to the use of lava rock is the length of time required for heating the rock to a temperature sufficient for cooking and also the time required for cooling the lava rock after the food has been cooked. An additional problem with lava rock is that it is expensive and must be replaced periodically.

SUMMARY OF THE INVENTION

According to the present invention, a new device has been developed to replace the lava rock conventionally used in gas grills, and the device is designed such that most of the grease drippings are evaporated, without any possibility of flare-ups during the cooking process.

According to the primary aspect of the invention, the gas grill incorporates a flavorizing element that replaces the lava rocks and is constructed of a good heatconductive material. The flavorizing bar consists of a generally inverted, V-shaped member that has a pair of opposed flat walls which define an included angle of about 125°, which may be about 90° to about 150°. The flavorizing element is positioned above the burner unit and covers the burner unit.

According to one aspect of the invention, the opposed walls have outwardly-deformed tabs which define vent openings for the gas burner.

BRIEF DESCRIPTION OF SEVERAL VIEWS OF DRAWINGS

FIG. 1 is a perspective view of a portable gas grill having the present invention incorporated therein;

FIG. 2 is a plan view with certain parts broken away for purposes of clarity;

DETAILED DESCRIPTION

Figure 3:
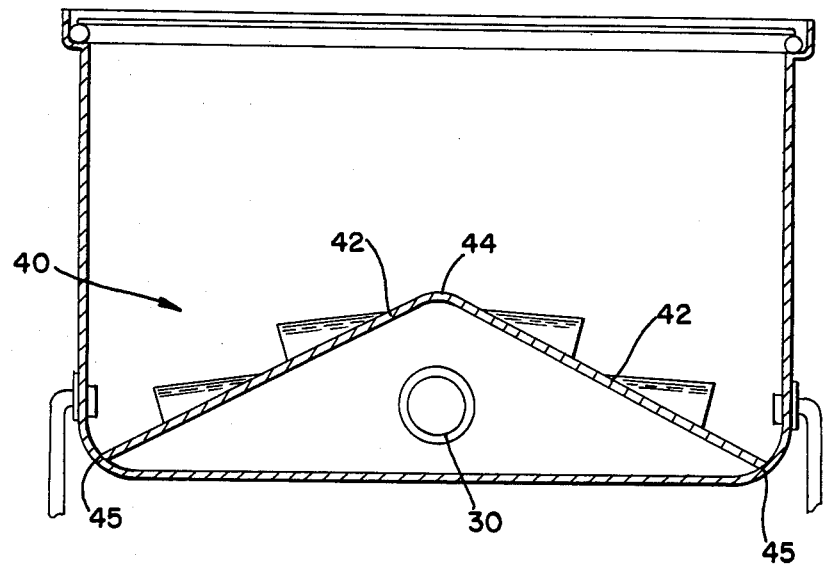
FIG. 3 is a cross-sectional view as viewed along line 3—3 of FIG. 2.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated.

FIG. 1 of the drawings discloses a portable gas grill, generally designated by reference numeral 10, that is presently marketed by the Assignee of the present invention. The portable grill 10 consists of a lower rectangular body 12 and a cover 14. The lower body 12 has a pair of pivoted leg structures 16 supported adjacent opposite ends thereof and the leg structures are designed to be pivoted over the cover 14 and be used as a carrying handle. The upper portion of the lower body has an outwardly-directed flange 20 which defines a ledge for a cooking grid 22. The lower body also has a pair of handles 24 at opposite ends thereof, while the cover, which rests on the offset flange 20, also has a handle 26.

The lower body 12 has an elongated burner tube 30 (FIG. 3) supported therein which has gas supplied thereto from a portable tank 32.

Figure 4:
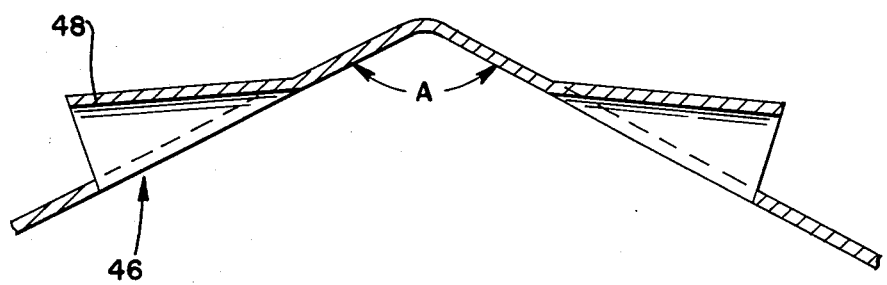
FIG. 4 is an enlarged fragmentary cross-sectional view of the sear bar of the present invention as viewed along line 4—4 of FIG. 2.

According to the primary aspect of the invention, the conventional heat-absorbing lava rock or equivalent material is eliminated in the gas grill 10 and is replaced with a flavorizing element or sear bar which functions in a more acceptable manner than any material heretofore utilized as a heat-absorbing material. The flavorizing element 40 is illustrated in FIGS. 3 and 4 and includes first and second generally flat planar walls 42 that merge at an apex 44. The flat walls have an included angle R. The included angle R is less than 150° and preferably in the range of about 100° to about 150°. In the embodiment illustrated in FIG. 4, the included angle is approximately 125° and it will be noted that the walls 42 define a generally inverted V-shaped member that is adapted to be positioned in an inverted position over the elongated burner tube 30 to cover and protect the burner tube. In the embodiment illustrated in FIGS. 3 and 4, the sear bar 40 is preferably formed from a cold-rolled steel and the apex 44 is located directly over the center of the tube 30.

Since the lower edges 45 of the walls 42 rest on the lower base of the body 12, the walls 42 preferably have vent openings 46 located therein and these vent openings are produced by deforming tabs 48 from the walls 42. The tabs are deformed outwardly and thus cover the openings in a vertical direction, but will still allow air to enter for proper ignition of the gases.

In actual use of the gas grill 10, it has been found that the heat from the gas burner 30 will rapidly heat up the walls 42 and any grease dripping from food being cooked on the cooking grid 22 will impinge on the outer surfaces of the flat walls and will evaporate before reaching the lower edges 45 of the walls 42.

The spacing between the single burner tube 30 and the apex 44 is important for proper operation of the unit and this spacing is, to a large measure, dependent on the angle R. If the spacing is too small, the flavorizing element will overheat, and if it is too large, it will not absorb sufficient heat to vaporize the grease. It has been found that if this spacing is about 2⅜ inches, the element will be properly heated.

Also, the number and size of the vent openings is important for proper oxygen supply. It has been found that four or six rectangular vents on each wall provide the necessary ventilation.

Actual tests have shown that the sear bar will heat-up quickly so that the grill is ready for cooking in a matter of minutes after the burner is lit. The sear bar also provides more uniform temperature than prior-known lava rock or other equivalent materials. The sear bar can be manufactured at a fraction of the cost, when compared with lava rock, and its lifespan is indefinite.

I claim:

1. In a rectangular gas grill including a rectangular lower portion having a flat bottom wall and having a single elongated burner tube positioned centrally adjacent said bottom wall of said grill and a rectangular searing element having first and second inclined flat walls merging at an apex that is spaced above and axially aligned with said tube, said flat walls having lower edges supported on said bottom wall to define a predetermined spacing between said tube and said apex, said flat walls having upwardly- and outwardly-deformed rectangular tabs that produce elongated vent openings for accommodating flow of oxygen to said burner tube, said tabs covering said vent openings in a vertical direction of said grill to prevent grease drippings from passing therethrough.

2. A gas grill as defined in claim 8, in which said flat walls define an included angle of about 125°.

* * * * *